United States Patent
Lee

(10) Patent No.: US 10,144,652 B2
(45) Date of Patent: Dec. 4, 2018

(54) FLUID MAGNETIZER

(71) Applicant: Chung-Ming Lee, Taichung (TW)

(72) Inventor: Wen-Pin Lee, Taichung (TW)

(73) Assignee: Chung-Ming Lee, Taichung (TW)

(*) Notice: Subject to any disclaimer, the term of this patent is extended or adjusted under 35 U.S.C. 154(b) by 204 days.

(21) Appl. No.: 15/263,764

(22) Filed: Sep. 13, 2016

(65) Prior Publication Data

US 2018/0072587 A1  Mar. 15, 2018

(51) Int. Cl.
| | | |
|---|---|---|
| *B01D 35/06* | (2006.01) | |
| *C02F 1/00* | (2006.01) | |
| *C02F 1/48* | (2006.01) | |
| *C02F 1/30* | (2006.01) | |
| *C02F 1/68* | (2006.01) | |

(52) U.S. Cl.
CPC ............ *C02F 1/005* (2013.01); *C02F 1/30* (2013.01); *C02F 1/481* (2013.01); *C02F 1/68* (2013.01)

(58) Field of Classification Search
CPC .. C02F 1/005; C02F 1/48; C02F 1/488; C02F 1/482; C02F 2303/22; C02F 1/485; C02F 2201/48; C02F 1/281; C02F 1/481; F02M 27/045; G01F 1/56; G01R 33/383; G01R 33/44; B03C 2201/18; B03C 1/288; B03C 1/286; B03C 1/0332; B03C 1/30; B03C 1/00; B03C 1/23

See application file for complete search history.

(56) References Cited

U.S. PATENT DOCUMENTS

| | | | | |
|---|---|---|---|---|
| 4,879,045 A | * | 11/1989 | Eggerichs | B03C 1/035 |
| | | | | 204/557 |
| 6,123,843 A | * | 9/2000 | Schoepe | C02F 1/482 |
| | | | | 210/222 |
| 7,351,341 B2 | * | 4/2008 | Tsuboi | C02F 1/485 |
| | | | | 204/155 |
| 7,410,574 B2 | * | 8/2008 | Hammond | B01D 35/06 |
| | | | | 210/195.2 |
| 8,197,683 B2 | * | 6/2012 | Lopes | B03C 1/286 |
| | | | | 204/554 |
| 8,247,204 B2 | * | 8/2012 | Korpela | B03C 1/286 |
| | | | | 435/173.9 |
| 9,463,470 B2 | * | 10/2016 | Murahashi | B03C 1/0332 |
| 2011/0001474 A1 | * | 1/2011 | Miller | G01F 1/56 |
| | | | | 324/306 |

FOREIGN PATENT DOCUMENTS

TW     M469308     1/2014

* cited by examiner

*Primary Examiner* — Ana M Fortuna
(74) *Attorney, Agent, or Firm* — Muncy, Geissler, Olds & Lowe, P.C.

(57) ABSTRACT

A fluid magnetizer is provided, including: a housing; a magnetizing member, received in the housing; a resonance member, cooperating with the magnetizing member to resonate, received in the housing, the resonance member, the magnetizing member and the housing defining a channel flowing past the resonance member and the magnetizing member.

5 Claims, 5 Drawing Sheets

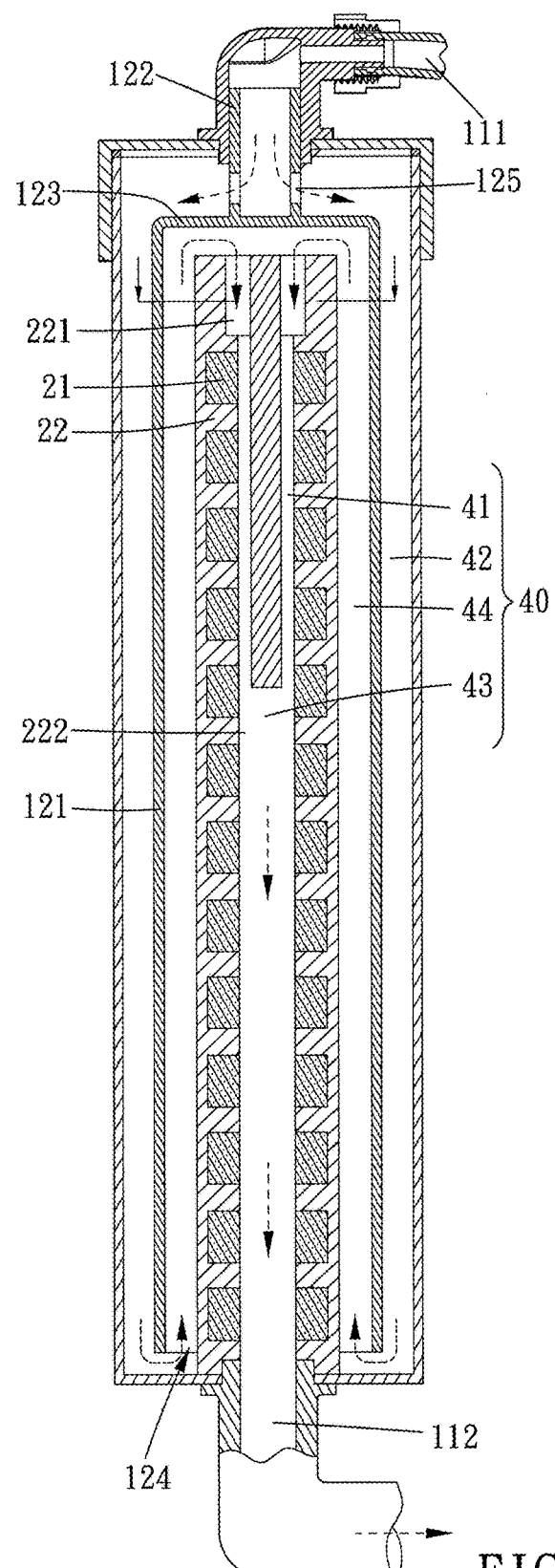
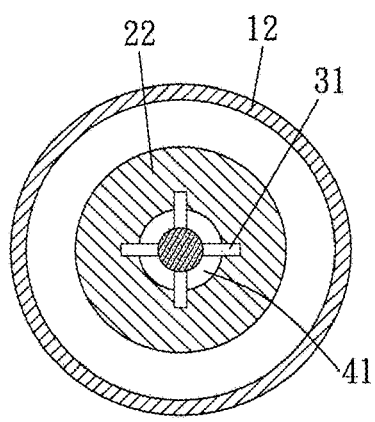
FIG. 3
FIG. 4

FLUID MAGNETIZER

BACKGROUND OF THE INVENTION

Field of the Invention

The present invention relates to an energizer, and more particularly to a fluid magnetizer.

Description of the Prior Art

People pay much attention to quality of water, so a filter and a fluid magnetizer are applied to water for drinking. For example, as water passes the fluid magnetizer, water molecule groups resonate because of the magnetic effect so that intermolecular force of water molecule groups is changed and water molecule groups is fined to be easily absorbed by the human body. TWM469308 discloses a fluid magnetizer as the aforementioned structure.

Recently, people are busy for working and lack of exercises, and the air is not clean, so it results in worse blood circulation and diseases to nervous system and respiratory passage. The conventional fluid magnetizer is only equipped with conventional magnets, so it can only fine the water molecule groups, but cannot release anions or/and emit infrared rays, so that it cannot add anions into water and cannot provide energetic resonance and antibiotic effect. As a result, the water produced cannot solve problems of bad blood circulation and diseases of nervous system and respiratory passage.

The present invention has arisen to mitigate and/or obviate the afore-described disadvantages.

SUMMARY OF THE INVENTION

The major object of the present invention is to provide a fluid magnetizer, for magnetizing and fining water molecule groups, adding anions into water, providing energetic resonance and antibiotic effect, improving blood circulation, advantaging the nervous system, the respiratory passage and hygiene.

To achieve the above and other objects, a fluid magnetizer is provided, including: a housing; a magnetizing member, received in the housing; a resonance member, cooperating with the magnetizing member to resonate, received in the housing, the resonance member, the magnetizing member and the housing defining a channel flowing past the resonance member and the magnetizing member.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 3 is a cross-sectional view of the preferred embodiment of the present invention;

FIG. 4 is a cross-sectional view of FIG. 3;

DETAILED DESCRIPTION OF THE PREFERRED EMBODIMENTS

Figure 1:
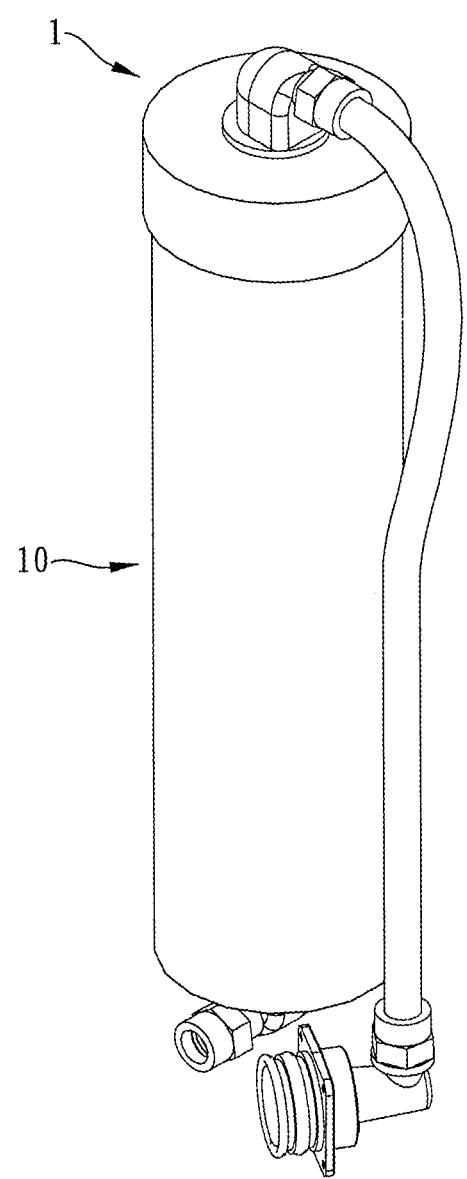
FIG. 1 is a stereogram of a preferred embodiment of the present invention.
Figure 2:
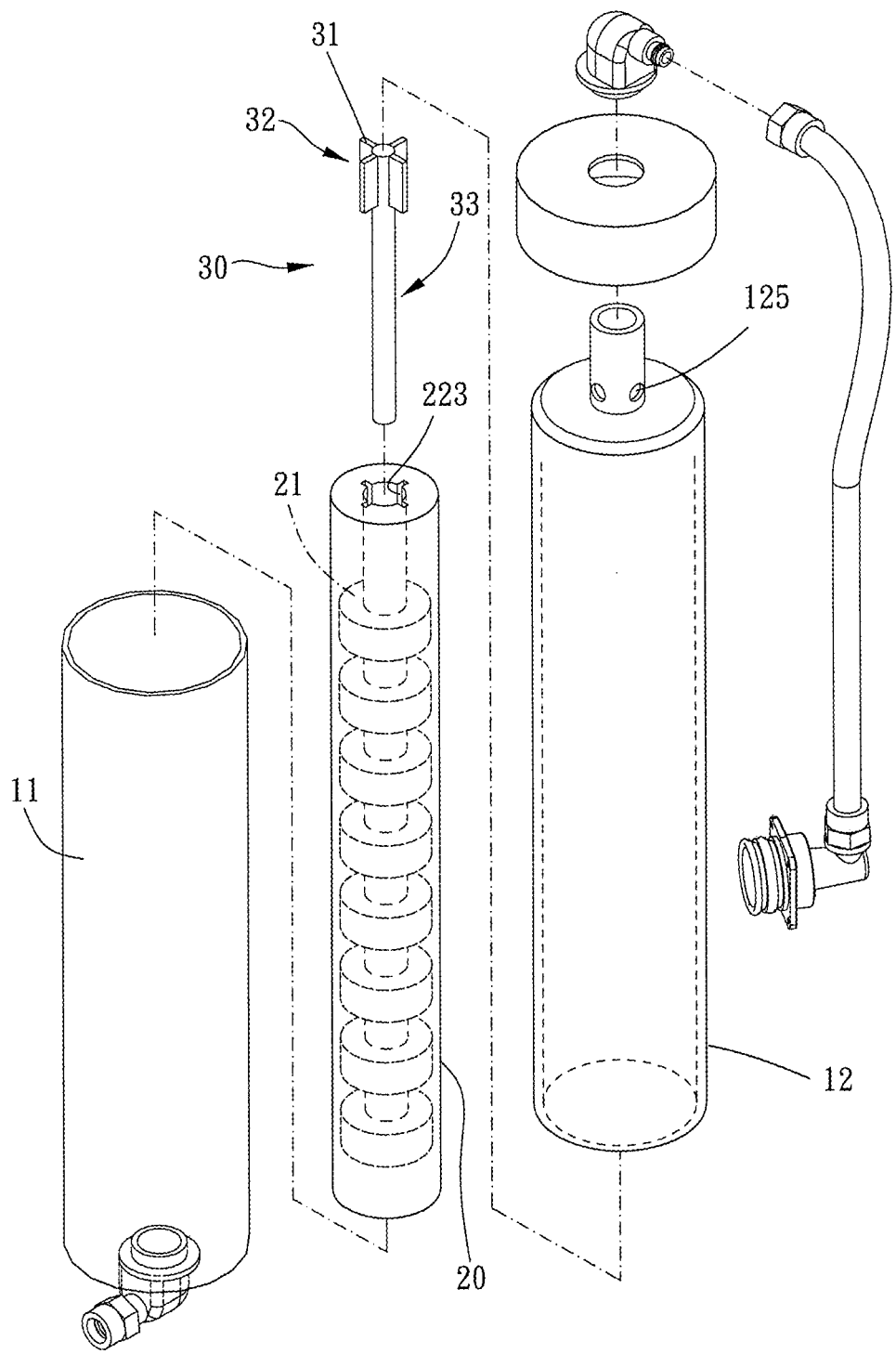
FIG. 2 is a breakdown view of the preferred embodiment of the present invention.

The present invention will be clearer from the following description when viewed together with the accompanying drawings, which show, for purpose of illustrations only, the preferred embodiment in accordance with the present invention.

Please refer to FIGS. 1 to 4 for a preferred embodiment of the present invention. A fluid magnetizer includes a housing 10, a magnetizing member 20 and a resonance member 30. The fluid may be, but not limited to, water or oil.

The housing 10 may be a plastic or stainless steel member, capable of avoiding pollution due to rust. The magnetizing member 20 is received in the housing 10. The resonance member 30 is received in the housing 10 and cooperates with the magnetizing member 20 to resonate, and the resonance member 30, the magnetizing member 20 and the housing 10 define a channel 40 flowing past the resonance member 30 and the magnetizing member 20. The magnetizing member 20 is preferably a powerful magnet, for example, and can fine the water molecule groups so that it can be absorbed by the human body. Preferably, the resonance member 30 is a silicon energizing member which includes crystalline silicon material. The silicon energizing member may be a silicon post manufactured under high temperature and high pressure, or formed by silicon fibers made from a mixture of nano silicon powers with nylon, polyester or polypropylene. The crystalline silicon material of the resonance member 30 can release anions, emit energetic waves such as infrared rays to resonate with carbohydrates of the human body to improve blood circulation. Additionally, the crystalline silicon material is antibiotic and ensures hygiene for drinking water. It is noted that the resonance member 30 may be made of other materials, for example, specific metals or non-metal materials capable of resonating with the magnetizing member 20.

The magnetizing member 20 and the resonance member 30 cooperate to resonate, for example, it can fine the water molecule groups, energize water, rearrange the water molecule groups, improve dissolved oxygen concentration of water, advantage the blood circulation and metabolism of the human body, clean body cells, and benefit heath.

Specifically, the magnetizing member 20 includes a plurality of magnetic bodies 21, and the plurality of magnetic bodies 21 is arranged along a direction in which the channel 40 extends. The magnetizing member 20 further includes an inner tube 22 extending along the channel 40, and the plurality of magnetic bodies 21 are annular and disposed around an axis of the inner tube 22, thus increasing area for magnetizing water. Preferably, the plurality of magnetic bodies 21 is encompassed within the inner tube 22 and partially exposed, and thus water can contact the plurality of magnetic bodies 21 so as to enhance magnetization effect. It is noted that the magnetic bodies may be C-shaped or in other shapes.

The resonance member 30 is inserted within the inner tube 22 and forms a gap 41 with an inner wall of the inner tube 22. The inner tube 22 includes a large-diametered hole 221 at one end of the inner tube 22 and a small-diametered hole 222 communicating with the large-diametered hole, and the resonance member 30 is inserted within the large-diametered hole 221 and forms the gap 41 with an inner face of the large-diametered hole 221. The gap 41 can control the water flow rate and ensure the action of the resonance member 30 on water.

Figure 5:
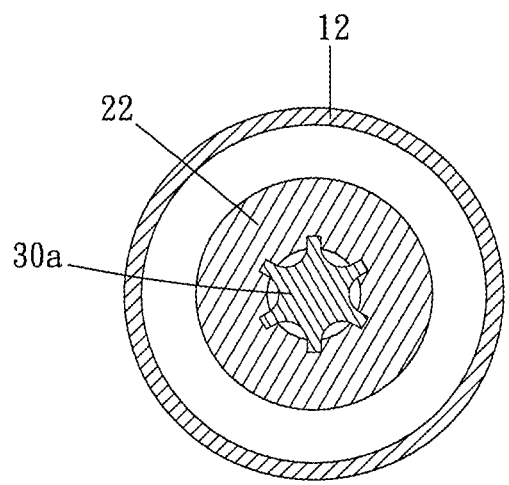
FIGS. 5 and 6 are views of another preferred embodiment of the present invention.
Figure 6:
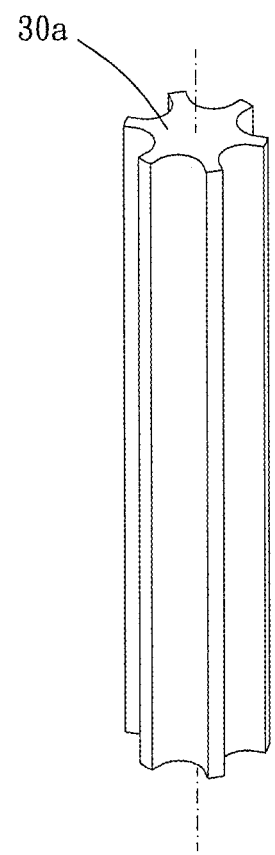

Specifically, the inner face of the large-diametered hole 221 has a plurality of engaging slots 223 recessed radially, the resonance member 30 includes a plurality of radial protrusions 31, and the plurality of radial protrusions 31 are engaged within the plurality of engaging slots 223, thus keeping the gap 41 in an uniform and suitable span. In this embodiment, the resonance member 30 includes an enlarged head 32 and a body portion 33 extending from the enlarged head 32. The enlarged head 32 includes the plurality of radial protrusions 31 and is received in the large-diametered hole 221, the body portion 33 is inserted within the small-diametered hole 222, the enlarged head 32 and the body portion 33 and the inner face of the large-diametered hole 221 and an inner face of the small-diametered hole form the gap 41. It is noted the resonance member 30a may be a post having a fixed cross-sectional shape, such as star-shaped (as shown in FIGS. 5 and 6).

Specifically, the housing 10 includes an outer shell 11 and an inner shell 12 received in the outer shell 11, the magnetizing member 20 is received in the inner shell 12, and the resonance member 30 is inserted within the magnetizing member 20. The outer shell 11, the inner shell 12, the magnetizing member 20 and the resonance member 30 form the channel 40 which is winding and communicate with one another, thus prolonging period of actions of the magnetizing member 20 and the resonance member 30 on water. The outer shell 11 includes an inlet 111 and an outlet 112, the inner shell 12 includes a tubular body 121 and a connecting head 122, the tubular body 121 includes a closed end 123 and an open end 124, and the tubular body 121 and the outer shell 11 define a first channel 42 therebetween. The connecting head 122 is connected to the closed end 123 and communicates with the inlet 111 and the first channel 42. One end of the magnetizing member 20 surrounds the outlet 112 and is connected to the outer shell 11, and the magnetizing member 20 has a second channel 43 communicating with the outlet 112 thereinside. The magnetizing member 20 and the inner shell 12 define a third channel 44 communicating with the first and second channels 42, 43. The resonance member 30 is inserted within the second channel 43 and corresponds to the outlet 112. The first, second channel and third channel 42, 43, 44 and the gap 41 form the channel 40.

Preferably, a depth through which the resonance member 30 is inserted into the magnetizing member 20 is larger than or equal to one-third of a length of the magnetizing member 20, thus prolonging period of actions of the resonance member 30 on water. The connecting head 122 has a plurality of through holes 125 extending radially and communicating with the inlet 111 and the first channel 42, thus permitting multiple entrances for water to enter the housing 10. A radial width of the second channel 43 is preferably larger than radial widths of the first and third channel 41, 44, thus reduce pressure drop between the inlet 111 and the outlet 112.

Figure 7:
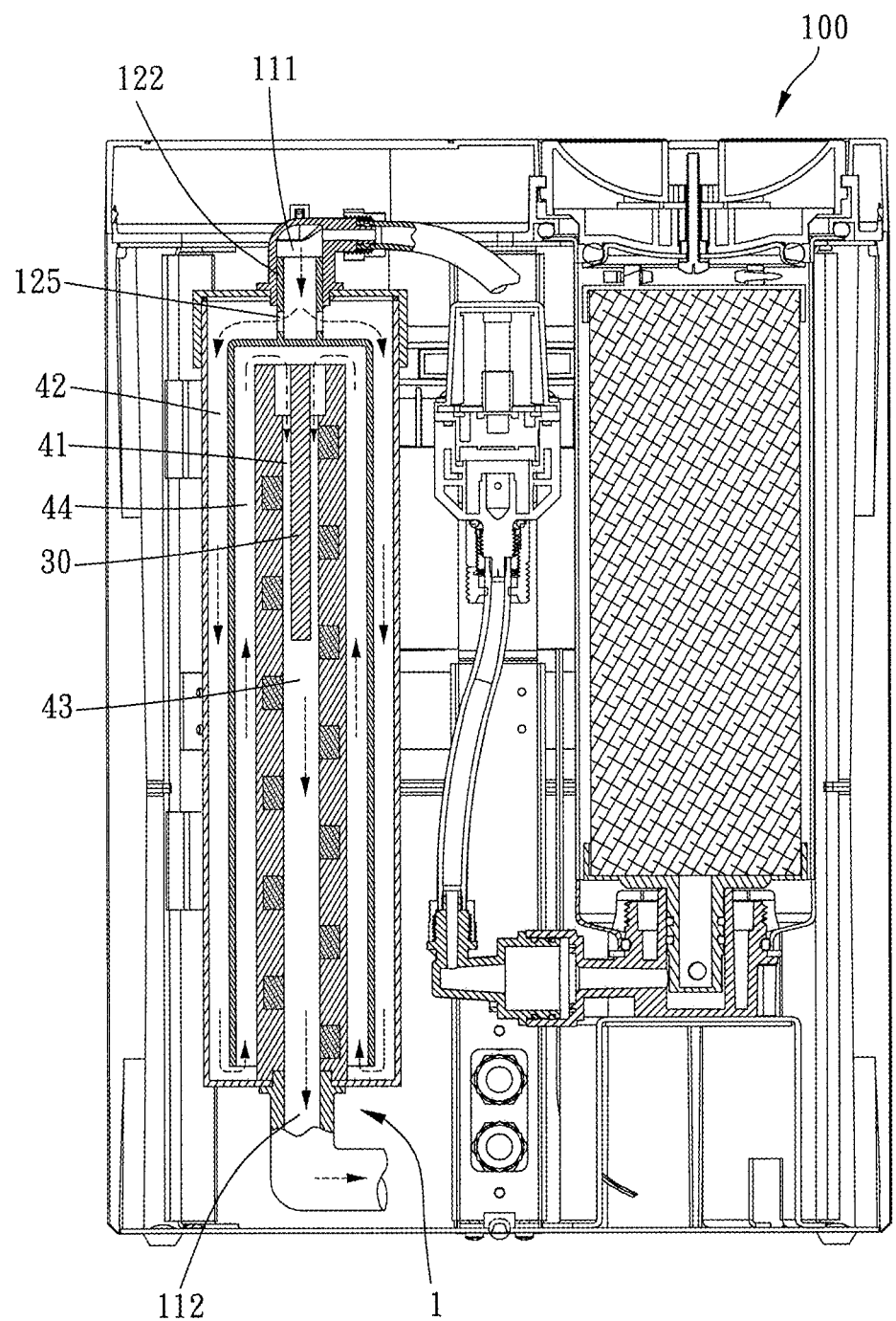
FIG. 7 is a view of a preferred embodiment of the present invention in use.

Please refer further to FIG. 7, in an actual application, a water dispenser 100 is equipped with the fluid magnetizer 1, water enters the connecting head 122 via the inlet 111, flows through the plurality of through holes 125 and into the first channel 42, then flows through the third channel 44, the gap 41 and the second channel 43, and finally discharges from the outlet 112. As water flows through the first, second channel and third channels 42, 43, 44 and the gap 41, water is affected by the magnetizing member 20 and the resonance member 30 all the time.

Given the above, the fluid magnetizer uses the magnetizing member to magnetize and fine the water molecule groups so that it is easy to be absorbed by the human body, and the fluid magnetizer uses the resonance member to add anions into water. Furthermore, the fluid magnetizer can provide energetic resonance and antibiotic effect, and improve blood circulation, advantage the nervous system, the respiratory passage and hygiene.

While we have shown and described various embodiments in accordance with the present invention, it should be clear to those skilled in the art that further embodiments may be made without departing from the scope of the present invention.

What is claimed is:
1. A fluid magnetizer, including:
a housing;
a magnetizing member, received in the housing;
a resonance member, cooperating with the magnetizing member to resonate, received in the housing, the resonance member, the magnetizing member and the housing defining a channel flowing past the resonance member and the magnetizing member;
wherein the magnetizing member includes a plurality of magnetic bodies, and the plurality of magnetic bodies is arranged along a direction in which the channel extends;
wherein the magnetizing member further includes an inner tube extending along the channel, and the plurality of magnetic bodies are annular and disposed around an axis of the inner tube;
wherein the resonance member is inserted within the inner tube and forms a gap with an inner wall of the inner tube;
wherein the inner tube includes a large-diametered hole at one end of the inner tube and a small-diametered hole communicating with the large-diametered hole, and the resonance member is inserted within the large-diametered hole and forms the gap with an inner face of the large-diametered hole;
wherein the inner face of the large-diametered hole has a plurality of engaging slots recessed radially, the resonance member includes a plurality of radial protrusions, and the plurality of radial protrusions are engaged within the plurality of engaging slots.

2. The fluid magnetizer of claim 1, wherein the resonance member includes an enlarged head and a body portion extending from the enlarged head, the enlarged head includes the plurality of radial protrusions and is received in the large-diametered hole, the body portion is inserted within the small-diametered hole, the enlarged head and the body portion form the gap with the inner face of the large-diametered hole and an inner face of the small-diametered hole.

3. A fluid magnetizer, including:
a housing;
a magnetizing member, received in the housing;
a resonance member, cooperating with the magnetizing member to resonate, received in the housing, the resonance member, the magnetizing member and the housing defining a channel flowing past the resonance member and the magnetizing member;
wherein the resonance member is a silicon energizing member including crystalline silicon material.

4. A fluid magnetizer, including:

a housing;

a magnetizing member, received in the housing;

a resonance member, cooperating with the magnetizing member to resonate, received in the housing, the resonance member, the magnetizing member and the housing defining a channel flowing past the resonance member and the magnetizing member;

wherein the housing includes an outer shell and an inner shell received in the outer shell, the magnetizing member is received in the inner shell, the resonance member is inserted within the magnetizing member, and the outer shell, the inner shell, the magnetizing member and the resonance member form the channel which is winding and communicate with one another;

wherein the outer shell includes an inlet and an outlet, the inner shell includes a tubular body and a connecting head, the tubular body includes a closed end and an open end, the tubular body and the outer shell define a first channel therebetween, the connecting head is connected to the closed end and communicates with the inlet and the first channel, one end of the magnetizing member surrounds the outlet and is connected to the outer shell, the magnetizing member has a second channel communicating with the outlet thereinside, the magnetizing member and the inner shell define a third channel communicating with the first and second channels, and the resonance member is inserted within the second channel and corresponds to the outlet.

5. The fluid magnetizer of claim 4, wherein a depth through which the resonance member is inserted into the magnetizing member is larger than or equal to one-third of a length of the magnetizing member, the connecting head has a plurality of through holes extending radially and communicating with the inlet and the first channel; a radial width of the second channel is larger than radial widths of the first and third channel.

* * * * *